United States Patent [19]

Hosoi et al.

[11] 4,116,784

[45] Sep. 26, 1978

[54] METHOD FOR CROSS-LINKING POLYETHYLENE WITH AN IONIZING RADIATION

[75] Inventors: Fumio Hosoi, Takasaki; Miyuki Hagiwara, Maebashi; Kunio Araki, Takasaki, all of Japan

[73] Assignee: Japan Atomic Energy Research Institute, Tokyo, Japan

[21] Appl. No.: 717,866

[22] Filed: Aug. 25, 1976

[30] Foreign Application Priority Data

Aug. 25, 1975 [JP] Japan .................... 50-102798
Aug. 25, 1975 [JP] Japan .................... 50-102799

[51] Int. Cl.$^2$ .................................................. C08F 8/00
[52] U.S. Cl. ........................... 204/159.16; 204/159.15; 204/159.17
[58] Field of Search ............. 204/159.17, 159.16, 204/159.15, 159.2; 260/876 R

[56] References Cited

U.S. PATENT DOCUMENTS

| | | | |
|---|---|---|---|
| 3,414,498 | 12/1968 | Shinohara et al. | 204/159.13 |
| 3,663,662 | 5/1972 | Golike et al. | 260/897 A |
| 3,709,806 | 1/1973 | Minami et al. | 204/159.2 |
| 3,894,928 | 7/1975 | Kagiya et al. | 204/159.17 |
| 3,923,621 | 10/1975 | Murayama et al. | 204/159.17 |

*Primary Examiner*—Murray Tillman
*Assistant Examiner*—Thurman K. Page
*Attorney, Agent, or Firm*—Flynn & Frishauf

[57] ABSTRACT

A method for cross-linking polyethylene, characterized in that polyethylene is blended with dipropargyl maleate and a copolymer selected from the group consisting of an ethylene-acrylonitrile copolymer, an ethylene-acrylic ester copolymer, an ethylene-substituted acrylic ester copolymer, ethylene-vinyl acetate copolymer, an ethylene-substituted vinyl acetate copolymer and mixtures thereof, and the resulting mixture being irradiated with an ionizing radiation.

8 Claims, No Drawings

METHOD FOR CROSS-LINKING POLYETHYLENE WITH AN IONIZING RADIATION

BACKGROUND OF THE INVENTION

This invention relates to a method for cross-linking polyethylene with an ionizing radiation, and more particularly, relates to a method for cross-linking polyethylene, characterized in that polyethylene is blended with dipropargyl maleate and a copolymer selected from the group consisting of an ethylene-acrylonitrile copolymer, an ethylene-acrylic ester copolymer, an ethylene-substituted acrylic ester copolymer, an ethylene-vinyl acetate copolymer, an ethylene-substituted vinyl acetate copolymer and mixtures thereof, and the resulting mixture being irradiated with an ionizing radiation.

It has been known that the mechanical, chemical and thermal properties of polyethylene can be improved through cross-linking. Especially, an irradiation method by ionizing radiation has an advantage in that cross-linking treatment can be carried out at low temperatures in the region of room temperature. However, when this cross-linking treatment of polyethylene is effected without using a special cross-linking agent, a large amount of ionizing radiation is required, and therefore side reactions such as cutting of main chains in polyethylene can not be ignored. For example, the cutting of main chains results in not only a decrease in cross-linking efficiencies but also a lowering of mechanical strength of cross-linked material. The irradiation of polyethylene with a great amount of accelerated electron rays also leads to a considerable decrease in the quality of cross-linked polyethylene because the accumulation of electric charge gives rise to the Lichtenberg breakdown of polyethylene and the elevation of temperatures induces the blowing of the polymer. Moreover, the irradiation of polyethylene with a great amount of radiation increases costs for maintaining and operating apparatus such as shielding apparatus. Therefore, development of a technique for reducing total dose of radiation is increasingly required for the spread of a cross-linking method by radiation.

In the prior art, it has been known that an amount of ionizing radiation for cross-linking a polymer can be reduced by adding a polyfunctional monomer, such as divinyl benzene or diethylene glycol diacrylate having plural double bonds per molecule to the polymer. However, according to this method, the promotion of cross-linking has not been satisfactory, and consequently a highly cross-linked polymer could not be obtained without a large amount of total dose of ionizing radiation. Therefore, the problem of reducing total dose of ionizing radiation remains unsolved in the case of cross-linking a polymer. There also remain several problems for radiation installation and safety in commercially practicing the method comprising contacting a polymer to be cross-linked with a gas or a low-boiling liquid.

We have found that a variety of polymers including an ethylenic polymer can be efficiently cross-linked by blending them with a high-boiling acetylenic compound having at least one ethynyl (CH≡C—) per molecule, followed by irradiating the blend with ionizing radiation (Japanese Patent Publication No. 44577/1974). However, the known method requires a considerably greater amount of an ionizing radiation to obtain a highly cross-linked polymer, because the formation rate of the cross-linked polymer is radpily lowered as the total dose of radiation and greater cross-linking percentage increase.

SUMMARY OF THE INVENTION

It has been discovered surprisingly that an excellent cross-linked polyethylene can be obtained by mixing the uncross-linked polyethylene with dipropargyl maleate and a copolymer selected from the group consisting of an ethylene-acrylonitrile copolymer, an ethylene-vinyl acetate copolymer, an ethylene-acrylic ester copolymer, an ethylene-substituted acrylic ester copolymer, an ethylene-substituted vinyl acetate copolymer and mixtures thereof, followed by irradiating the resulting mixture with an ionizing radiation. Additionally, the total dose of ionizing radiation used in this invention is substantially smaller as compared with that required when the ethylenic polymer is irradiated in the presence of dipropargyl maleate. This invention is based on the said discovery.

Therefore, one object of this invention is to provide a method for preparing polyethylene having mechanically, electrically and thermally excellent properties, and the method does have have the above disadvantages involved in the cross-linking treatment by an ionizing radiation.

According to the present invention, it is possible to markedly promote the formation rate of cross-linked material in the initial stage as well as to increase the gel percent of the resulting polymer.

Polyethylene to be cross-linked by the present invention includes high, low and medium density polyethylene.

Ethylene-acrylonitrile copolymers include a random- or block-copolymer obtained by polymerizing a monomer mixture consisting essentially of ethylene and acrylonitrile, or a graft-polymer obtained by polymerizing polyethylene and a monomer mixture consisting essentially of acrylonitrile. The ratio of acrylonitrile unit in this copolymer preferably ranges from about 5 to about 50% by weight.

Ethylene-acrylic esters or substituted acrylic ester copolymer include a random- or block-copolymer obtained by polymerizing a monomer mixture consisting essentially of ethylene and an acrylic ester or a substituted acrylic ester, or a graft-polymer obtained by polymerizing polyethylene and a monomer mixture consisting essentially of the acrylic ester or the substituted acrylic ester. The ratio of the acrylic ester or the substituted acrylic ester unit in this copolymer preferably ranges from about 5 to about 70% by weight.

Ethylene vinyl acetate copolymers include a random- or block-copolymer obtained by polymerizing a monomer mixture consisting essentially of ethylene and vinyl acetate or a substituted vinyl acetate, or a graft-polymer obtained by polymerizing polyethylene and a monomer mixture consisting essentially of vinyl acetate or a substituted vinyl acetate. The ratio of vinyl acetate or substituted vinyl acetate unit in this copolymer preferably ranges from about 3 to about 70% by weight.

Typical examples of the acrylic ester include an ester of acrylic acid and an aliphatic alcohol, an alicyclic alcohol or an aromatic alcohol, such as methyl acrylate, ethyl acrylate, propyl acrylate, isopropyl acrylate, n-butyl acrylate, isobutyl acrylate, n-octyl acrylate, ethylhexyl acrylate, cyclohexyl acrylate, or benzyl acrylate, and a polyfunctional acrylic ester, such as methylene diacrylate, dimethylene diacrylate, tetramethylene diacrylate, hexamethylene diacrylate, or trimethylolpropane triacrylate.

The term "substituted acrylic ester" in the specification and the claims means a derivative of the acrylic ester in which the ester residue of the acrylic ester is substituted for a group having a carbon-carbon unsaturated double bond, halogen, such as chlorine, hydroxyl group, carboxyl group, amino group, or cyano group. Examples of the substituted acrylic esters include quinone acrylate, 2-amino-cyclohexyl acrylate, cyanomethyl acrylate, omega-chloro n-butyl acrylate, omega-hydroxyl n-butyl acrylate and allyl acrylate.

The term "substituted vinyl acetate" in the specification and the claims means a derivative of vinyl acetate in which the methyl group of vinyl acetate is substituted by an alkyl group, halogen such as chlorine, or hydroxyl group. Typical examples of the substituted vinyl acetate include vinyl 2,2-dimethylpropionate, vinyl 2-ethylbutyrate, vinyl 3,3-dimethylbutyrate, vinyl monochloroacetate, vinyl dichloroacetate and vinyl methoxyacetate.

Ethylene-acrylonitrile copolymers, ethylene-methyl acrylate copolymers, ethylene-ethyl acrylate copolymers and ethylene-vinyl acetate copolymers are preferred as the copolymer component in the present invention. Ethylene-acrylonitrile copolymers are particularly preferred.

The promotion mechanism of cross-linking in the present invention is not clear. The present method can actually increase cross-linking efficiencies as compared with the known method, and can also improve stability in size, mechanical properties such as tensile strength, chemical properties such as resistance to chemicals, and thermal properties such as thermal deformation temperatures of polyethylene.

In the present invention, polyethylene to be cross-linked can be used in any form of powder, pellets, strings, plates, rod-cable and other arbitrarily molded products.

There is no limitation in the method for blending polyethylene with such a copolymer and dipropargyl maleate. For example, these materials may be dissolved in a solvent dissolving these materials and deposited with a solvent which is a poor solvent for the materials. They may be molten and blended by means of an extruder or heated roller. It is preferred that they are blended by means of a heated roller.

The amount of the copolymer added to polyethylene depends on the nature of polyethylene, the degree of cross-linking required, the proportion of ethylene in the copolymer, and the nature of monomer which copolymerizes with ethylene. In an ethylene-acrylonitrile copolymer, the content of acrylonitrile unit generally ranges from about 0.1 to about 50% by weight, preferably from about 0.5 to about 10% by weight, based on the weight of polyethylene. In an ethylene-acrylic ester or substituted acrylic ester copolymer, the content of the acrylic ester unit or substituted acrylic ester unit generally ranges from about 0.02 to about 50% by weight, preferably from about 0.5 to about 20% by weight, more preferably from about 1 to about 5% by weight based on the weight, of polyethylene. In an ethylene-vinyl acetate or substituted vinyl acetate copolymer, the content of the vinyl acetate unit or substituted vinyl acetate unit generally ranges from about 2 to about 50% by weight, preferably from about 5 to about 20% by weight, based on the weight of polyethylene.

The amount of dipropargyl maleate added to polyethylene conveniently ranges from about 0.01 to about 20% by weight, preferably from about 0.5 to about 5% by weight, based on the weight of polyethylene.

Under such conditions, polyethylene can be cross-linked by the irradiation of an ionizing radiation. Examples of the ionizing radiation include accelerated electron beams, gamma rays, X-rays, alpha rays and beta rays. Accelerated electron beams and gamma rays are preferred.

Dose rate of the radiation may range from about $10^3$ to about $10^6$ rad/hr, preferably from about $10^4$ to about $10^5$ rad/hr. However, polyethylene containing the copolymer and dipropargyl maleate can be irradiated with an accelerated electron beam for a high dose rate of from $10^6$ to $10^7$ rad/sec.

The irradiation may be carried out in air or under an inert atmosphere of nitrogen, helium, argon, carbon dioxide or mixtures thereof. To carry out the irradiation in vacuo is further effective.

The procedures and advantages of the present invention are illustrated in the following representative examples. However, it is understood that the present invention is not limited to these examples and that any modification and correction can be accomplished within the technical scope of the present invention. Parts and percent are by weight, unless otherwise specified.

EXAMPLES 1 AND 2

Powdered polyethylene obtained by re-precipitating commercial low-density polyethylene pellets was pre-irradiated in vacuum at $-78°$ C with 1 Mrad of $^{60}$Co γ-ray at a dose rate of $5 \times 10^5$ rad/hr and graft-polymerized with acrylonitrile in gas-phase at 30° C without contact with air. Graft ratio of this polyethylene was 6.4 wt %.

To each of two samples of the above low-density polyethylene pellets, two samples of 5 or 20.2% of an acrylonitrile-grafted polyethylene (graft ratio is 6.3%) and 2% of dipropargyl maleate on the weight of polyethylene were added, respectively. And each mixture was blended by heated rollers and then hot-pressed to obtain samples 0.2mm thick. The content of acrylonitrile unit in each sample was 0.3 and 1.2 wt T, respectively.

Each sample was charged into a stainless steel reaction vessel and irradiated under a nitrogen atmosphere at 30° C with 2.0 and 8.0 Mrad gamma rays from $^{60}$Co, respectively. As a control, two films were prepared, charged into a stainless steel reaction vessel and irradiated at room temperature under a nitrogen atmosphere with the same dose of γ-ray. One of the films was 0.2mm thick, which was prepared by heating and pressurizing the said polyethylene pellets. The other was prepared according to the same method as above except that the said polyethylene was blended only with 2 wt % of dipropargyl maleate.

These irradiated samples were immersed and extracted with boiling xylene until their weight became constant. The ratio of undissolved materials (i.e. gel percent) is given in table 1. In the table, gel percent of 67.6% was obtained when an acrylonitrile-grafted polyethylene was blended. However, if a cross-linking agent were absent or dipropargyl maleate alone was added, 25 and 12 Mrad of radiation was required to obtain the same gel percent or gel percent of 67.6%.

Thus, the cross-linking of polyethylene can be promoted by irradiation when dipropargyl maleate is added, but further promoted if an acrylonitril-grafted polyethylene is added together with dipropargyl maleate; thus, the chemical resistance of polyethylene can be improved remarkably.

Table 1

| | Additive | gel percent (%) | | |
|---|---|---|---|---|
| | | 2.0 | 8.9 | (Mrad) |
| control | no addition | 0.0 | 39.4 | |
| control | 2% of dipropargyl maleate added | 32.3 | 64.0 | |
| Example 1 | acrylonitrile-grafted polyethylene (5.0%)[a] + dipropargyl maleate (2%) | 44.1 | 67.8 | |
| Example 2 | acrylonitrile-grafted polyethylene (20.2%)[a] + dipropargyl maleate | 47.3 | 68.6 | |

[a] The amount of acrylonitrile blended.

EXAMPLE 3

The test sample was prepared according to the procedure of Example 1 except that 10.1% of an acrylonitrile-grafted polyethylene was used. The ratio of acrylonitrile unit in the samples was 0.6%.

Two samples were irradiated at room temperature in air with 2 MeV accelerated electron ray, for a total dose of 2.0 Mrad 8.0 Mrad, respectively, and then immersed in boiling xylene. Gel percent measured is listed in table 2.

It is seen from the table that after the addition of acrylonitrile and dipropargyl maleate, cross-linking of polyethylene can be promoted remarkably by irradiation with an accelerated electron ray.

Table 2

| | Additive | gel percent (%) | | |
|---|---|---|---|---|
| | | 2.0 | 8.0 | (Mrad) |
| control | no addition | 0.0 | 32.0 | |
| control | dipropargyl maleate (2%) added | 32.6 | 63.9 | |
| Example 3 | acrylonitrile-grafted polyethylene (10.1%)[a] + dipropargyl maleate (2%) | 45.7 | 67.4 | |

EXAMPLE 4

Powdered polyethylene was prepared from the low-density polyethylene pellets by a procedure similar to that of example 1. The powdered polyethylene was pre-irradiated in vacuo at −78° C with 1 Mrad of total dose from $^{60}Co$ γ-ray (5 × 10$^5$ rad/hr), and then grafted in gas-phase with acrylonitrile without contact with air. Graft ratio of acrylonitrile to polyethylene was 18.5%.

38.4 wt % of the grafted polyethylene was added to the said low-density polyethylene and then the resulting mixture was blended with 2 wt % of dipropargyl maleate by heated rollers. The blend was heated and pressurized to form films of 0.2 mm thickness. The ratio of acrylonitrile in the sample was 0.6 %.

Two samples were irradiated with $^{60}Co$ γ-ray in a manner similar to that of Example 1. Then, the ratio of undissolved materials (gel percent) was measured by using boiling xylene. The results are shown in Table 3.

Table 3

| | Additive | gel percent (%) | | |
|---|---|---|---|---|
| | | 2.0 | 0.8 | (Mrad) |
| control | no addition | 0.0 | 39.4 | |
| control | dipropargyl maleate (2%) added | 32.3 | 64.0 | |
| Example 4 | acrylonitrile-grafted polyethylene (38.4%)[a] + dipropargyl maleate (2%) added | 46.5 | 75.9 | |

EXAMPLE 5

The powdered polyethylene obtained in Example 1 was charged into a H-shaped ampule and pre-irradiated with 1 Mrad of total dose from $^{60}Co$ γ-ray. The pre-irradiated polyethylene was grafted by contacting it with a vapour of a mixed solution of acrylonitrile and methyl acrylate (molar ratio = 1 : 1). Graft ratio of the samples was 16.9 wt %.

31.3 wt % of the above acrylonitrile and methyl acrylate-grafted polyethylene was added to the polyethylene pellets of Example 1, and then blended with 2 wt % of dipropargyl maleate by heated rollers at 120° C. The blend was heated and pressurized to form films of about 0.2mm thickness. The ratio of acrylonitrile and methyl acrylate graft components was 45 wt %.

The samples were charged into an autoclave and irradiated with γ-ray by the same method as that of Example 1. Then, the sample was immersed in boiling xylene and gel percent was determined. The results are given in Table 4.

Table 4

| | Additive | gel percent (%) | | |
|---|---|---|---|---|
| | | 2.0 | 8.0 | (Mrad) |
| control | no addition | 0.0 | 39.4 | |
| control | dipropargyl maleate (2 wt %) added | 32.3 | 64.0 | |
| Example 5 | acrylonitrile-methyl acrylate grafted polyethylene + 2 wt % of dipropargyl maleate | 47.9 | 76.8 | |

As seen from the Table, 76.8% of gel percent of polyethylene was attained when acrylonitrile and a methyl acrylate-grafted polyethylene was added. However, if polyethylene contains only dipropargyl maleate or no cross-linking agent, 40 and 25 Mrad of total dose were required to obtain the same gel percent.

It is seen from these results that the addition of acrylonitrile and a methyl acrylate-grafted polyethylene promotes the cross-linking of polyethylene remarkably; and thus the chemical resistance of polyethylene can be improved remarkably.

EXAMPLE 6

Commercial polyethylene powder was metered in a H-shaped ampule, preliminarily irradiated with 1Mrad of $^{60}Co$ γ-ray in vacuum at −78° C at a dose rate of 5 × 10$^5$ rad/hr, then grafted with a given amount of methyl acrylate in gaseous phase at 30° C. The graft ratio of methylacrylate grafted to polyethylene was 8.4 wt %.

To the pellets of said low-density polyethylene were added 50 wt % of methylacrylate-grafted polyethylene and 2 wt % of dipropargyl maleate based on the weight of polyethylene. The resulting mixture was intimately blended by hot rollers at 120° C, and hot-pressed to obtain samples each about 0.2mm thick. The proportion of the acrylic ester unit in each sample was 4.3 wt %.

The samples were irradiated with $^{60}$Co γ-ray at a dose rate of $5 \times 10^5$ rad/hr in vacuum at room temperature, followed by extraction with boiling xylene until the weights of the undissolved portions were constant. The proportions of the undissolved portions (i.e. their gel percents) are indicated in Table 5.

Control tests were effected according to the above procedure of Example 6, except that no additive was used, or 2% of propargyl maleate was added to the sample.

Table 5 shows that the addition of a methylacrylate-grafted polyethylene allows a remarkable increase in the degree of cross-linking of the polyethylene.

Table 5

| | Additive | gel percent (%) | | |
|---|---|---|---|---|
| | | 2.0 | 8.0 | (Mrad) |
| control | no addition | 0.0 | 8.0 | |
| control | dipropargyl maleate (2 wt %) | 32.8 | 64.0 | |
| Example 6 | methylacrylate-grafted polyethylene + dipropargyl maleate (2 wt %) | 47.8 | 76.9 | |

According to the method of this invention, a total dose of 8.0 Mrad was sufficient for obtaining 76.9% of gel percent, but more radiation was required if no cross-linking agent was used or if only dipropargyl maleate was used: about 40 Mrad was needed for the former case and 25 Mrad for the latter.

EXAMPLE 7

Polyethylene flakes of the kind obtained in Example 6 were irradiated with 2 Mrad of $^{60}$Co γ-ray according to the manner described in Example 5. After addition of 20 wt % of polyethylene which was grafted with 9.1 wt % of methylacrylate, the irradiated polyethylene was intimately blended with dipropargyl maleate and hot-pressed to obtain films each 0.2mm thick (see Example 5 for further details). The proportion of the acrylic ester unit in each of the samples was 4.8 wt %.

The samples were charged into an autoclave of 50 cc. capacity, and irradiated with $^{60}$Co γ-ray in vacuum ($10^{-4}$ mm Hg) at room temperature for a total dose of 2.0 and 8.0 Mrad. The gel percent of polyethylene (c) to which was added a methylacrylate-grafted polyethylene and dipropargyl maleate is compared in Table 6 with that of polyethylene (a) to which was added no cross-linking agent, and of polyethylene (b) to which was added only 2 wt % of dipropargyl maleate.

Table 6 shows that the irradiation of γ-rays in the presence of a methylacrylate-grafted polyethylene and dipropargyl maleate results in a remarkably higher degree of cross-linking of the polyethylene.

Table 6

| | Additive | Gel percent (%) | | |
|---|---|---|---|---|
| | | 2.0 | 8.0 | (Mrad) |
| control | (a) | 0.0 | 39.4 | |
| control | (b) | 32.0 | 64.5 | |
| Example 6 | (c) | 49.8 | 71.5 | |

EXAMPLE 8

Polyethylene flakes of the kind obtained in Example 6 were grafted with 60.9 wt% of methyl acrylate according to the manner described in Example 6. The thus grafted polyethylene was added to the aforementioned pellets of polyethylene (ZF-36 manufactured by Mitsubishi Yuka Co.) in an amount of 8.4 wt%, and the resulting mixture was intimately blended with dipropargyl maleate, and hot-pressed to obtain samples each 0.2 mm thick. The proportion of the acrylic ester unit in each sample was 5.1 wt%.

The samples were irradiated with gamma rays according to the manner described in Example 6. The contents of the portions undissolved in boiling xylene, in other words, the gel percents thereof, are indicated in Table 7.

Table 7

| | Additive | Gel percent (%) | | |
|---|---|---|---|---|
| | | 2.0 | 8.0 | (Mrad) |
| Control | No addition | 0.0 | 39.4 | |
| Control | dipropargyl maleate (2 wt%) | 32.8 | 64.0 | |
| Example 7 | methylacrylate-grafted polyethylene + dipropargyl maleate (2 wt%) | 34.8 | 71.1 | |

EXAMPLES 9 – 11

Polyethylene of the kind described in Example 6 was preliminarily irradiated with $^{60}$Co-gamma ray for a total dose of 1 M rad according to the manner specified in Example 6. The irradiated polyethylene was then subjected to the following treatments:

(a) Ethyl acrylate was grafted at room temperature to obtain 23.0 wt% of grafted polyethylene. Said polyethylene was intimately blended in an amount of 21.7 wt% with polyethylene pellets of the kind described in Example 6. The proportion of the acrylic ester unit in the resulting sample was 5.2 wt%.

(b) Butyl acrylate was grafted according to the manner described in Example 6 to obtain 26.6 wt% of grafted polyethylene. Said polyethylene was intimately blended in an amount of 34.7 wt% with polyethylene pellets of the kind described before. The proportion of the acrylic ester unit in the sample obtained was 10.0 wt%.

(c) 2-Ethylhexyl acrylate was grafted at room temperature to obtain 38.9 wt% of grafted polyethylene. Said grafted polyethylene was intimately blended in an amount of 32.2 wt% with low-density polyethylene pellets of the kind specified in Example 6.

The proportion of the acrylic ester unit in each of the samples (a), (b) and (c) was 13.5 wt%. These samples were further mixed with 2 wt% of dipropargyl maleate, and processed according to the same manner as described in Example 6 to obtain films each 0.2 mm thick.

The respective samples were irradiated with $^{60}$Co-gamma ray in a nitrogen atmosphere at room temperature at a dose rate of $5 \times 10^5$ rad/hr. The contents of the portions which remained undissolved in boiling xylene are indicated in Table 8.

The Table shows clearly that the gel percent of polyethylene obtained according to the manner described in Example 6 using acrylic ester-grafted polyethylene and dipropargyl maleate as cross-linking agents was remarkably higher than when no cross-linking agent was used or when only dipropargyl maleate was added.

Table 8

| | Additive | Gel percent (%) | | |
|---|---|---|---|---|
| | | 2.0 | 8.0 | (Mrad) |
| Control | No addition | 0.0 | 39.4 | |
| Control | Dipropargyl maleate (2 wt%) | 32.3 | 64.0 | |
| Example 9 | (a) | 41.3 | 75.2 | |
| Example 10 | (b) | 52.4 | 77.9 | |

Table 8-continued

|  | Additive | Gel percent (%) | | |
|---|---|---|---|---|
|  |  | 2.0 | 8.0 | (Mrad) |
| Example 11 | (c) | 53.6 | 73.9 | |

EXAMPLE 12

To polyethylene of the kind employed in Example 6 was added 25 wt% of a commercial ethyl acrylate-ethylene copolymer (DPDJ-8026 manufactured by Nihon Unikah) comprising 8 mole % of ethyl acrylate, and the mixture was intimately blended with hot rollers with 2 wt% of dipropargyl maleate at 120° C, followed by hot-pressing to obtain films each about 0.2 mm thick. The proportion of the acrylic ester unit in each sample was 3.6 wt%.

The samples were charged into an autoclave and irradiated with $^{60}$Co-gamma ray in vacuum ($10^{-4}$ mm Hg) at room temperature for a total dose of 2 and 8 Mrad. The gel percents of the irradiated polyethylenes were determined by using boiling xylene. Table 9 shows that the polyethylene to which an ethyl acrylate-ethylene copolymer was added had solvent resistance improved remarkably over that of the other polyethylenes.

Table 9

|  | Additive | Gel percent (%) | | |
|---|---|---|---|---|
|  |  | 2.0 | 8.0 | (Mrad) |
| Control | No addition | 0.0 | 39.4 | |
| Control | Dipropargyl maleate (2 wt%) | 32.0 | 64.5 | |
| Example 12 | Ethyl acrylate-ethylene copolymer + dipropargyl maleate (2 wt%) | 45.8 | 73.1 | |

EXAMPLE 13

To polyethylene of the kind described in Example 9 was added 9.9 wt% of a commercial ethyl acrylate-ethylene copolymer (EPDJ-9169 manufactured by Nihon Yunikah; this contains 18 mol % of ethyl acrylate), and the resulting mixture was intimately blended with hot rollers with dipropargyl maleate, and hot-pressed to obtain films each about 0.2 mm thick. The proportion of the acrylic ester unit in each sample was 4.3 wt%.

The samples were irradiated with electron beams at a dose rate of $5 \times 10^5$ rad/sec. The contents of the undissolved portions, that is, their gel percents were determined according to the manner described in Example 9 and are indicated in Table 10.

The polyethylene irradiated with electron beams after the addition of the ethyl acrylate-ethylene copolymer and dipropargyl maleate could easily be cross-linked, with its solvent resistance being improved remarkably over the case where no cross-linking agent was used or where only dipropargyl maleate was used as such agent.

Table 10

|  | Additive | Gel percent (%) | | |
|---|---|---|---|---|
|  |  | 2.0 | 8.0 | (Mrad) |
| Control | No addition | 0.0 | 32.0 | |
| Control | Dipropargyl maleate (2 wt%) | 32.6 | 63.9 | |
| Example 13 | Ethyl acrylate-ethylene copolymer + dipropargyl maleate | 44.5 | 71.7 | |

Table 10-continued

|  | Additive | Gel percent (%) | | |
|---|---|---|---|---|
|  |  | 2.0 | 8.0 | (Mrad) |
|  | (2 wt%) | | | |

EXAMPLE 14

Polyethylene flakes of the kind employed in Example 6 were irradiated with $^{60}$Co-gamma ray for a total dose of 1 M rad according to the manner described in Example 6. The thus obtained polyethylene was grafted in gaseous phase with about 10 wt% of a mixture of monomers of methyl acrylate and acrylonitrile, thereby obtaining a grafted polyethylene with a graft ratio of 16.2%.

To 31.3 wt% of the thus grafted polyethylene was added the polyethylene pellets of Example 6 (comprising 4.7 wt% of the vinyl monomer unit), and the resulting mixture was subjected to hot rollers at 120° C in the presence of 2 wt% of dipropargyl maleate, followed by hot-pressing to obtain films each about 0.2 mm thick.

The samples were then irradiated with $^{60}$Co gamma ray at a dose rate of $5 \times 10^5$ rad/hr at room temperature in a nitrogen atmosphere. The contents of the portions undissolved in boiling xylene, i.e. the gel percents of these portions, are indicated in Table 11.

TAble 11

|  | Additive | Gel percent (%) | | |
|---|---|---|---|---|
|  |  | 2.0 | 8.0 | (Mrad) |
| Control | No addition | 0.0 | 39.4 | |
| Control | Dipropargyl maleate (2 wt%) | 32.3 | 64.0 | |
| Example 14 | Methyl acrylate, acrylonitrile-grafted polyethylene + dipropargyl maleate (2 wt%) | 47.9 | 76.8 | |

EXAMPLE 15

Powdered polyethylene obtained by re-precipitating commercial low-density polyethylene pellets was placed in an H-shaped ampule, and was pre-irradiated in vacuo at −78° C with 1 M rad of gamma rays from $^{60}$Co at a dose rate of $5 \times 10^5$ rad/hr and was graft-polymerized with vinyl acetate in gas-phase at 30° C. Graft ratio of vinyl acetate was 16.3%.

To the above low-density polyethylene powder were added 42.1% of vinyl acetate-grafted polyethylene and 2% of dipropargyl maleate. The resulting mixture was blended with a heated roller and then hot-pressed to obtain film samples 0.2 mm thick. The content of vinyl acetate unit in the sample was 5.9%.

Each sample was charged into a stainless steel reaction vessel and irradiated under a nitrogen atmosphere at room temperature with 2.0 M rad and 8.0 M rad of gamma rays for $^{60}$Co at a dose rate of $5 \times 10^5$ rad/hr, respectively.

The irradiated samples were immersed and extracted with boiling xylene until their weights became constant. The ratio of undissolved materials (i.e., gel percent) is given in Table 12.

As control tests, two film samples were prepared, charged into a stainless steel reaction vessel and irradiated at 30° C under a nitrogen atmosphere with the same dose of gamma rays. One of the films was 0.2 mm thick; thus was prepared by heating and pressurizing the above polyethylene powder alone. The other was prepared according to the method described above, except that the above polyethylene powder was blended only with 2% of dipropargyl maleate. These samples were treated according to the procedure of the above Example.

Thus, the cross-linking of polyethylene can be promoted by irradiation when dipropargyl maleate is added, but further promoted if a vinyl acetate-grafted polyethylene is added together with dipropargyl maleate; thus, the chemical resistance of polyethylene can be improved remarkably.

According to the method of this invention, a total dose of 8.0 M rad was sufficient for obtaining 77.3% of gel percent, but more radiation was required if (a) no cross-linking agent was used, or (b) only dipropargyl maleate or (c) only a vinyl acetate-grafted polyethylene was used: about 40, 25, 35 was needed, respectively.

Table 12

| | Additive | Gel percent (%) | |
| --- | --- | --- | --- |
| | | 2.0 Mrad | 8.0 Mrad |
| Control | No addition | 0.0 | 32.3 |
| Control | Dipropargyl maleate (2 wt%) | 39.4 | 64.0 |
| Control | Vinyl acetate-grafted polyethylene (42.1%) | 19.3 | 47.4 |
| Example 15 | Vinyl acetate-grafted polyethylene (42.1%) + dipropargyl maleate (2%) | 52.3 | 77.3 |

EXAMPLE 16

According to the procedure of Example 15, a vinyl acetate-grafted polyethylene was prepared in which the graft ratio of vinyl acetate was 9.5%. To the polyethylene obtained by Example 515 were added 17.8% of the vinyl acetate-grafted polyethylene and 2% of dipropargyl maleate based on the weight of polyethylene. The resulting mixture was blended and hot-pressed with a heated roller to obtain film samples 0.2 mm thick. The content of vinyl acetate unit in the sample was 1.5%.

The film sample was irradiated with an electron beam (2 MeV) for a total dose of 2 M rad.

As control tests, a film sample composed of only polyethylene and a film sample composed of polyethylene and 2% of dipropargyl maleate were prepared. The film samples were irradiated with an electron beam (2 MeV) for a total dose of 2 M rad.

The gel percent of each of these samples was measured. The results are shown in Table 13.

Table 13

| | Additive | Gel percent (%) |
| --- | --- | --- |
| Control | No addition | 0.0 |
| Control | 2% dipropargyl maleate | 32.3 |
| Example 16 | Dipropargyl maleate 30 vinyl acetate-grafted polyethylene | 46.9 |

It is apparent from Table 13 that irradiation with an electron beam in the presence of a vinyl acetate-grafted polyethylene and dipropargyl maleate results in forming a remarkably higher degree of cross-linking in polyethylene.

EXAMPLE 17

According to the procedure of Example 15, a vinyl acetate-grafted polyethylene was prepared in which the graft ratio of vinyl acetate was 40.0%. To the polyethylene obtained in Example 15 were added 20.6% of the vinyl acetate-grafted polyethylene and 2% of dipropargyl maleate. A film sample was prepared from the resulting mixture. The content of vinyl acetate unit in the sample was 5.9%.

As control tests, a film sample composed of only polyethylene and a film sample composed of polyethylene and 2% of dipropargyl maleate were prepared according to the above procedure.

These film samples were irradiated with gamma rays from $^{60}$Co for a total dose of 2.0 M rad and 8.0 Mrad, respectively, The gel percent of each of these samples was measured. The results are shown in Table 14.

Table 14

| | Additive | Gel percent (%) | |
| --- | --- | --- | --- |
| | | 2.0 Mrad | 8.0 Mrad |
| Control | No addition | 0.0 | 39.4 |
| Control | Dipropargyl maleate (2%) | 32.3 | 64.0 |
| Example 17 | Dipropargyl maleate + vinyl acetate-grafted polyethylene | 42.7 | 74.9 |

EXAMPLE 18

The procedure of Example 17 was repeated except that 48.1% of the vinyl acetate-grafted polyethylene was used. The content of vinyl acetate unit in the sample was 13.3%.

The test samples were prepared for control tests according to the procedure of Example 17.

These samples were placed in an autoclave and were irradiated in vacuo at room temperature with gamma rays from $^{60}$Co for a total dose of 2.0 M rad and 8.0 M rad, respectively. The gel percent of each of the irradiated samples was measured. The results are shown in Table 15. It was apparent from Table 15 that the resistance to solvent of the sample in which a vinyl acetate-grafted polyethylene and dipropargyl maleate were added thereto was improved remarkably.

Table 15

| | Additive | Gel percent (%) | |
| --- | --- | --- | --- |
| | | 2.0 Mrad | 8.0 Mrad |
| Control | No addition | 0.0 | 39.4 |
| Control | Dipropargyl maleate (2%) | 32.3 | 64.0 |
| Example 15 | Dipropargyl maleate + vinyl acetate-grafted polyethylene | 48.2 | 76.4 |

In the present invention, an acrylic ester, a substituted acrylic ester, vinyl acetate, a substituted vinyl acetate and acrylonitrile have hydrogen in the $\alpha$ position. Therefore, when a the copolymer of these monomers and ethylene is added to polyethylene, the crosslinking of polyethylene is promoted considerably. The fact is clarified by the following Example 19.

EXAMPLE 19

| Pre-irradiation conditions | |
| --- | --- |
| Dose rate | 2 hrs |
| Total dose | 0.5 Mrad/hr |
| Time | 2 hrs |
| Atmosphere | dry/ice-methanol |

| Grafting conditions | |
| --- | --- |
| Atmosphere | room temperature |
| Time | 16 hrs |
| Graft ratio | |
| methyl acrylate | 11.84% |

-continued

| | Grafting conditions | |
|---|---|---|
| methyl methacrylate | | 9.66% |

The results are shown in Table 16.

Table 16

| Run No. | Monomer grafted | Total dose (Mrad) | Gel percent (%) | Gel percent (%)* |
|---|---|---|---|---|
| 1 | none | 0 | 0 | |
| 2 | methyl acrylate | 0 | 21.9 | 12.6 |
| 3 | methyl methacrylate | 0 | 0 | |
| 1-1 | none | 2 | 0 | |
| 2-1 | methyl acrylate | 2 | 32.5 | 24.5 |
| 3-1 | methyl methacrylate | 2 | 8.1 | |
| 1-2 | none | 8 | 32.0 | |
| 2-2 | methyl acrylate | 8 | 64.4 | 60.2 |
| 3-2 | methyl methacrylate | 8 | 33.9 | |

*Gel percent of polyethylene on the assumption that all methyl acrylate was crosslinked.

What is claimed is:

1. A method for cross-linking polyethylene, characterized in that polyethylene is blended with dipropargyl maleate and a copolymer selected from the group consisting of an ethylene-acrylonitrile copolymer, an ethylene-acrylic ester copolymer, an ethylene-substituted acrylic ester copolymer, an ethylene-vinyl acetate copolymer, an ethylene-substituted vinyl acetate copolymer and mixtures thereof, and the resulting mixture is irradiated with an ionizing radiation.

2. The method defined in claim 1, wherein the copolymer is selected from the group consisting of an ethylene-acrylonitrile copolymer, an ethylene-methyl acrylate copolymer, an ethylene-ethyl acrylate copolymer and an ethylene-vinyl acetate copolymer.

3. The method defined in claim 1, wherein the copolymer is an ethylene-acrylonitrile copolymer.

4. The method defined in claim 1, wherein the copolymer is an ethylene-methyl acrylate copolymer.

5. The method defined in claim 1, wherein the copolymer is an ethylene-ethyl acrylate copolymer.

6. The method defined in claim 1, wherein the copolymer is an ethylene-vinyl acetate copolymer.

7. The method defined in claim 1, wherein the amount of dipropargyl maleate added to polyethylene ranges from about 0.01% to about 5% by weight based on the weight of polyethylene.

8. The method defined in claim 1, wherein the ionizing radiation is gamma rays or accelerated electron beam.

* * * * *